United States Patent
Dawes et al.

(10) Patent No.: US 9,108,876 B2
(45) Date of Patent: Aug. 18, 2015

(54) PRESSED, MULTILAYERED SILICA SOOT PREFORMS FOR THE MANUFACTURE OF SINGLE SINTER STEP, COMPLEX REFRACTIVE INDEX PROFILE OPTICAL FIBER

(71) Applicants: Steven Bruce Dawes, Corning, NY (US); Dominick Fiordimalva, Wilmington, NC (US); Timothy Leonard Hunt, Wilmington, NC (US); Douglas Hull Jennings, Corning, NY (US)

(72) Inventors: Steven Bruce Dawes, Corning, NY (US); Dominick Fiordimalva, Wilmington, NC (US); Timothy Leonard Hunt, Wilmington, NC (US); Douglas Hull Jennings, Corning, NY (US)

(73) Assignee: Corning Incorporated, Corning, NY (US)

( * ) Notice: Subject to any disclaimer, the term of this patent is extended or adjusted under 35 U.S.C. 154(b) by 107 days.

(21) Appl. No.: 13/685,782

(22) Filed: Nov. 27, 2012

(65) Prior Publication Data

US 2014/0060118 A1    Mar. 6, 2014

Related U.S. Application Data

(60) Provisional application No. 61/564,912, filed on Nov. 30, 2011.

(51) Int. Cl.
*C03B 37/018* (2006.01)
*C03B 37/014* (2006.01)
*C03B 37/012* (2006.01)
*G02B 6/036* (2006.01)

(52) U.S. Cl.
CPC .......... *C03B 37/01853* (2013.01); *C03B 37/014* (2013.01); *C03B 37/01282* (2013.01); *G02B 6/036* (2013.01); *C03B 2201/08* (2013.01); *C03B 2201/20* (2013.01); *C03B 2201/30* (2013.01); *C03B 2203/22* (2013.01); *C03B 2203/23* (2013.01)

(58) Field of Classification Search
CPC ................................................. C03B 37/01282
See application file for complete search history.

(56) References Cited

U.S. PATENT DOCUMENTS

| | | | | |
|---|---|---|---|---|
| 4,345,928 A | * | 8/1982 | Kawachi et al. | 65/412 |
| 4,867,774 A | * | 9/1989 | Dorn | 264/1.21 |
| 5,090,980 A | * | 2/1992 | Clasen | 65/391 |

(Continued)

FOREIGN PATENT DOCUMENTS

| | | |
|---|---|---|
| DE | 102005036746 | 2/2007 |
| JP | H01277801 | 11/1989 |

(Continued)

OTHER PUBLICATIONS

Dorn, Raimund, "Glass Fibres from Mechanically Shaped Preforms," Glastechnische Berichte, vol. 60, No. 3, Jan. 1, 1987, pp. 79-82.

(Continued)

*Primary Examiner* — Lisa Herring
(74) *Attorney, Agent, or Firm* — Robert L. Carlson

(57) ABSTRACT

Manufacturing an optical fiber by using an outside vapor deposition technique for making a substrate, applying one or more layers to the substrate using a radial pressing technique to form a soot blank, sintering the soot blank in the presence of a gaseous refractive index-modifying dopant, and drawing the sintered soot blank, provides a more efficient and cost effective process for generating complex refractive index profiles.

21 Claims, 4 Drawing Sheets

(56) References Cited

U.S. PATENT DOCUMENTS

| | | | |
|---|---|---|---|
| 5,158,587 A * | 10/1992 | Kyoto et al. | 65/398 |
| 5,352,259 A | 10/1994 | Oku et al. | |
| 2001/0043782 A1 * | 11/2001 | Yokoyama et al. | 385/127 |
| 2003/0063880 A1 | 4/2003 | Koumura et al. | |
| 2003/0140659 A1 * | 7/2003 | Fabian | 65/412 |
| 2004/0110007 A1 | 6/2004 | Kim et al. | |
| 2005/0229639 A1 | 10/2005 | Otosaka et al. | |
| 2009/0317653 A1 * | 12/2009 | Wakade et al. | 428/548 |
| 2010/0043782 A1 * | 2/2010 | Kilambi et al. | 127/1 |
| 2010/0071421 A1 * | 3/2010 | Dawes et al. | 65/427 |
| 2010/0107700 A1 * | 5/2010 | Dawes et al. | 65/404 |
| 2011/0132038 A1 * | 6/2011 | Dawes et al. | 65/408 |
| 2012/0275751 A1 * | 11/2012 | Krabshuis et al. | 385/126 |
| 2012/0321891 A1 * | 12/2012 | Nunome | 428/392 |
| 2013/0025326 A1 * | 1/2013 | Dabby | 65/422 |

FOREIGN PATENT DOCUMENTS

| | | |
|---|---|---|
| JP | H05254849 | 10/1993 |
| WO | 2010036310 | 4/2010 |
| WO | WO 2011108639 A1 * | 9/2011 |

OTHER PUBLICATIONS

PCT International Search Report, PCT/US2012/057178, Aug. 2013.

Nagel, Suzanne R., Mac Chesney, J.B., Walker, Kenneth L., Overview of the Modified Chemical Vapor Deposition (MCVD) Process and Performance IEEE, Journal of Quantum Electronics, vol. QE-18, Issue 4, Apr. 1982, pp. 459-476.

Mac Chesney, J.B., Johnson, D.W., Jr., Bhandarkar, S., Bohrer, M.P., Flemming, J.W., Monberg, E.M., Trevor, D.J., "Optical Fiber by a Hybrid Process Using Sci-Gel Silica Overcladding Tubes", Journal of Non-Crystalline Solids 226, 1998, 232-238.

Renner-Erny, Ruth; Di Labio, Loredana, Luthy, Willy, "A Novel Technique for Active Fibre Production" Optical Materials 29 (2007) 919-922.

Yoshida, K., (R&D Lab., Furukawa Elect. Co Ltd., Yokohama, Japan); Satoh, T.; Enomoto, N.; Yagi, T.; Hihara, H.; Oku, M., "Fabrication of Optical Fiber Preform by CIP Forming Technique," Journal of the Ceramic Society of Japan, v 104, n 6, p. 524-528, Jun. 1996.

Yoshida, K., (Furukawa Electr. Co. Ltd., Yokohama, Japan); Satoh, T.; Enomoto, N.; Yagi, T.; Hihara, H.; Oku, M.; "Fabrication of Large Preforms for Low-Loss Single-Mode Optical Fibers by a Hydridized Process," Source: Glass Science and Technology, v 69, n 12, p. 412-416, Dec. 1996.

Yousef, E.; Hotzel, M.; Russel, C.; "Effect of ZnO and Bi2O3 Addition on Linear and Non-linear Optical Properties of Tellurite Glasses," ,Journal of Non-Crystalline Solids, 353 (2007) 333-338.

Clarke, K.; Ito, Y.; "Manufacture of Fluorinde Glass Preforms," Journal of Non-Crystalline Solids, 140 (1992) 265-268.

Kazuaki Yoshida, "Fabrication of Low-Loss Optical Fibers by Hybridized Process," Scripta Technica, Electronics and Communications in Japan, Part 2, 9 pages, vol. 80, No. 2, 1997.

* cited by examiner

PRESSED, MULTILAYERED SILICA SOOT PREFORMS FOR THE MANUFACTURE OF SINGLE SINTER STEP, COMPLEX REFRACTIVE INDEX PROFILE OPTICAL FIBER

CROSS-REFERENCE TO RELATED APPLICATIONS

This application claims the benefit of priority under 35 U.S.C. §119 of U.S. Provisional Application Ser. No. 61/564,912 filed on Nov. 30, 2011, the content of which is relied upon and incorporated herein by reference in its entirety.

FIELD

This disclosure relates to the manufacture of optical fiber, in particular manufacturing processes which involve pressing of silica based soot to form at least a portion of the optical fiber preform.

BACKGROUND

Various processes or techniques have been used to manufacture optical fiber. Most of these processes include a step of manufacturing a glass preform and subsequently drawing the preform to create an optical fiber. A typical silica preform includes a core section and at least one cladding section that is concentric to the core section and has a lower refractive index than the core section. The difference in refractive index can be achieved, for example, by appropriate doping of the core and/or cladding. Most commonly, germanium oxide is used as a dopant in the core section to increase the refractive index of the core. Various other dopants that are known to increase the refractive index can be used instead of, or in combination with, the germanium dopant. Alternatively, or in addition, dopants that are known to reduce the refractive index, such as boron- and fluorine-containing dopants, can be added to the cladding.

Optical waveguide preforms are typically made using a chemical vapor deposition (CVD) technique. Examples include modified chemical vapor deposition (MCVD), vapor axial deposition (VAD) and outside vapor deposition (OVD). In all of these chemical vapor deposition processes, an intermediate product called a preform is prepared by deposited glass material (mostly silica) in the form of very small particles or soot onto a substrate. The preform has a structure similar to that of the final optical fiber, but also has notable differences, such as density, dimension and porosity. The final dimensions of the optical fiber are achieved by a drawing process in which the final diameter of the fiber is on the order of about 125 micrometers.

In the case of modified chemical vapor deposition, reactants flow through a reactor tube together with a mixture of carrying gases (e.g., argon and/or helium) and oxidizing gas (e.g., oxygen) in controlled quantities. The reaction tube is typically made of silica, and is heated by an external burner that may traverse the length of the tube as the tube is rotated. Silica and other glass components are deposited on the inside surface of the tube and reaction products exit the end of the tube opposite the end at which the reactants are added.

The outside vapor deposition process involves deposition of glass particles or soot on the outer surface of a cylindrical rod typically made of alumina or graphite. The rod is typically rotated and exposed to a flame of a burner. The reactants are injected into the flame together with a fuel gas, such as methane or hydrogen. The core material is deposited first, followed by the cladding material. When deposition is complete, the substrate rod (also known as a "bait rod") is removed from the center of the porous preform and the preform is placed into a consolidation furnace. During consolidation, water vapor is removed from the preform. The high-temperature consolidation step sinters the preform into a solid, dense and transparent glass. The consolidated glass preform is then placed on a draw tower and drawn into one continuous strand of glass fiber.

The outside vapor deposition process has been employed for large scale production of optical fibers. Advantages include production of a purely synthetic optical fiber exhibiting enhanced reliability, the ability to manufacture optical fibers exhibiting precise geometrical and optical consistency, scalability, high production rates, and greater manufacturing independence (because there is no reliance on a separate supply of reactor tubes used in a MCVD process). However, a disadvantage with the OVD process is that the starting materials are not efficiently utilized. Accordingly, it would be desirable to provide a process for manufacturing an optical fiber having complex refractive index profile features in which there is a step change in the refractive index over a distance less than 2 micrometers in optical fiber space, which makes more efficient use of material.

Other techniques that have been explored for producing an optical fiber having complex refractive index profile features include modified chemical vapor deposition, which deposits soot of varying dopant concentrations in a single sintering step. The dopants in the MCVD process are delivered via flame hydrolysis through a burner.

SUMMARY

The processes disclosed herein provide optical fibers having complex refractive index profile features. The process steps provide more efficient use of raw materials than conventional OVD techniques, thereby reducing the manufacturing cost. In particular, the various embodiments disclosed herein utilize a radial pressing step to apply multiple layers of powdered silica, concentrically, to a substrate produced by outside vapor deposition. The resulting body is a monolithic silica soot blank containing multiple, concentric soot layers pressed onto a core made using an OVD process.

In certain embodiments, a process for manufacturing an optical fiber having complex refractive index profile features includes preparing a substrate using an outside vapor deposition technique, pressing one or multiple concentric layers of silica powder over the substrate to obtain a monolithic soot blank. The multiple concentric layers can have different physical properties. The soot blank is then sintered in the presence of a refractive index-modifying gaseous dopant, whereby each of the layers retains a different concentration of gaseous refractive index-modifying dopant due to differences in the physical properties of the layers causing the resulting optical fiber drawn from the sintered blank to have complex refractive index profile features.

In accordance with certain embodiments, gaseous dopants that may be employed include, but are not limited to, chlorine ($Cl_2$), silicon tetrachloride ($SiCl_4$), silicon tetrafluoride ($SiF_4$), sulfur hexafluoride ($SF_6$), and carbon tetrafluoride ($CF_4$).

In accordance with certain embodiments, each of the pressed layers can be comprised of a silica-based soot having a different chemical composition. For example, each of the pressed layers could comprise different solid dopants and/or different concentrations of solid dopants. In accordance with certain of these embodiments, the solid dopants may comprise a compound containing fluorine, boron, germanium, erbium, titanium, aluminum, lithium, potassium, bromine, cesium, chlorine, sodium, neodymium, bismuth, antimony, ytterbium, rubidium and combinations of these dopants.

Certain processes described herein may include outside vapor deposition of a layer between two pressed layers or as a final layer over a pressed layer.

In accordance with certain embodiments, the soot blank is further subjected to consolidating and redrawing into a cane and applying at least one additional layer by radial pressing.

In accordance with certain embodiments, the pressure applied during different radial pressing steps is varied. This causes the pressed layers to vary in density and/or porosity, and also vary in the amount of gaseous dopant that can be incorporated into the respective layers, thereby controlling dopant concentration in the respective radial pressed layers. In other embodiments, the surface area of the soot in the pressed layer is modified to also vary the amount of gaseous dopant that can be incorporated.

Certain processes disclosed herein involve preparing a substrate using an outside vapor deposition technique, applying a plurality of layers of material having physical properties and/or a chemical composition different from the substrate and different from each adjacent layer, with at least one of the layers being applied by radial pressing technique, and at least one other layer being applied by an outside vapor deposition technique.

Additional features and advantages will be set forth in the detailed description which follows and will be apparent to those skilled in the art from the description or recognized from the description which follows together with the claims and appended drawings.

It is to be understood that the foregoing description is exemplary and is intended to provide an overview for understanding the claims.

DETAILED DESCRIPTION

A complex refractive index profile feature (RIPF) is defined as any region of the refractive index profile that includes a step change, such as at least 0.002% delta over a distance of 2 microns, in index over a short distance, such as less than 2 micrometers in fiber space.

Figure 1:
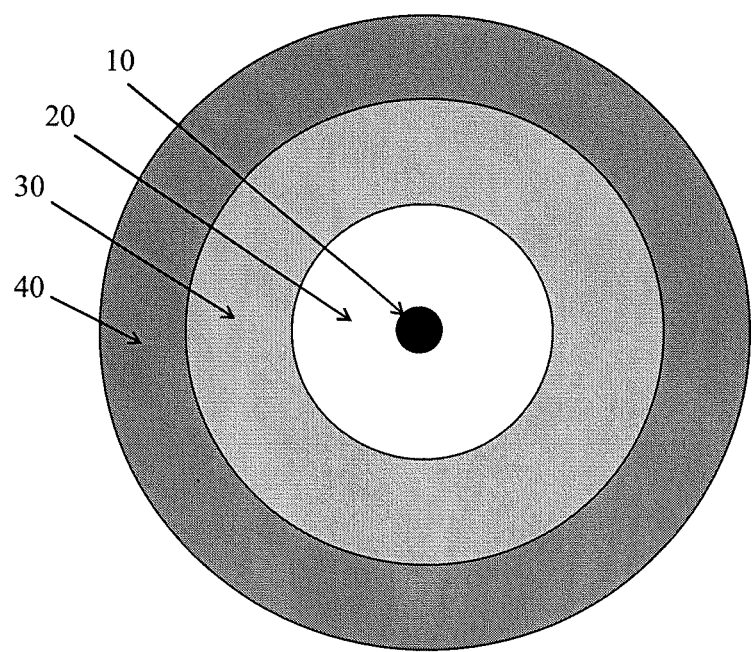
FIG. 1 is a cross sectional schematic of a pressed blank with an outside vapor deposition manufactured substrate target, and two pressed layers.

FIG. 1 illustrates an optical fiber preform, or blank, made using the processes disclosed herein. In the embodiment illustrated in FIG. 1, core region 10 is consolidated glass (e.g. germanium doped silica made via outside vapor deposition and then consolidated into void free glass), and first cladding layer 20 is undoped silica soot which has been deposited onto core region 10 via outside vapor deposition. Second and third cladding layers 30 and 40 are two soot pressed layers having different physical properties which have been pressed onto the optical fiber preform blank. As used herein, the terms "sintered" and "consolidated," and the like are used interchangeably and refer to an act of transforming silica from a fumed silica structure to a fused silica structure, such as by thermal treatment. Examples of consolidating include heating the materials to remove gas that is trapped within OVD deposited or pressed silica powders to bond together into a single structure.

Figure 2:
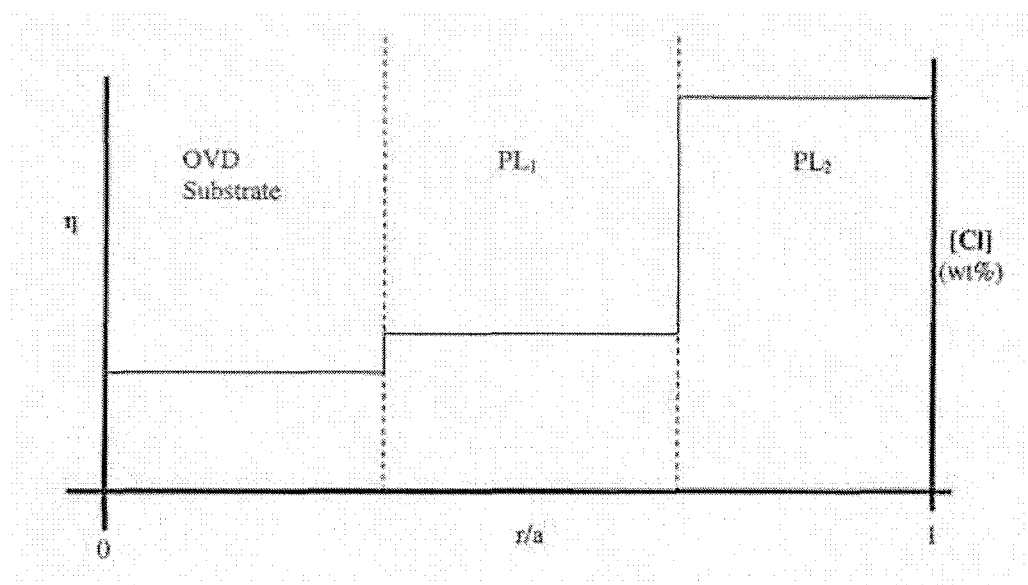
FIG. 2 is a graph showing a refractive index profile along the y-axis created by using different chlorine concentrations on each of two different pressed layers during a single consolidation step.

The processes disclosed herein utilize a radial press process to apply multiple layers of powdered silica, concentrically, to an OVD substrate. In some embodiments, the layers are binder-free. For example, pressing methods disclosed in WO2010036310, the specification of which is incorporated by reference in its entirety, may be employed for the powdered silica radial pressing steps. The resultant body is a monolithic silica soot blank containing multiple, concentric layers of pressed soot with a core made by an OVD process (FIG. 1). By selecting the porosity, surface area, and/or soot density of the soot used to form pressed silica soot regions 30 and 40, a multilayered, monolithic soot blank may be formed such that the outer cladding layers 30 and 40 and optionally the inner cladding 20 have different physical properties such as porosity, surface area, and/or soot density. As a result of these interlayer physical property distinctions, each layer of soot will retain a different concentration of gaseous dopant during the doping and sintering steps. The fiber may thus be designed so that the amount of dopant that is retained by the final optical fiber glass body varies radially and is dependent on the physical properties of the different layers of the multilayered, monolithic soot blank. Applicable dopants include but are not limited to, for example, chlorine, via use of $Cl_2$ or $SiCl_4$, fluorine, via use of $SiF_4$, $SF_6$, or $CF_4$, and phosphorus via use of $POCl_3$ or $PCl_3$. The different physical properties (e.g., porosity, surface area, and/or soot density) of the silica soot pressed outer cladding layers 30 and 40 (as well as optionally the OVD deposit cladding layer 20) will result in different indices of refraction, radially, due to the varied retention of gaseous dopants by layer (as shown in FIG. 2). Consequently, different pressed silica soot layers having the different physical properties listed above can be used to design complex refractive index profiles which can be doped in a single doping step.

The embodiments disclosed herein may also utilize the pressing process to apply multiple layers of powdered silica-based soot, concentrically, to an OVD substrate, wherein each layer is comprised of soot with a unique chemical composition. For example, increasing amounts of germania doped silica can be employed in sequentially pressed layers, thus resulting in an increasing refractive index across the various regions of pressed silica once those regions are consolidated. The resultant body may be a monolithic silica-based soot blank containing multiple, concentric layers of pressed soot, each layer of soot yielding different indices of refraction. Soot compositions could include fluorine, boron, germanium, erbium, titanium, aluminum, lithium, potassium, bromine, cesium, chlorine, phosphorus, sodium, neodymium, bismuth, antimony, ytterbium, and combinations of these dopants, amongst other dopants in a silica matrix.

One method to achieve a designed profile including multiple sequential pressed layers of soot, differing in physical or compositional properties, is to perform a series of radial pressing steps, each adding in sequence each radial segment of soot. Alternatively, more than one distinct layer can be provided in a single radial pressing step by fitting removable dividers into the cavity of the mold outside of the substrate, and extending the full axial length of the mold. One or more removable dividers can be positioned in the mold, either individually or as an assembly. The divider can be composed of any material that will sufficiently retain its shape and position during the soot fill and divider removal steps, such as, but not limited to, card stock, foil, Teflon, or HDPE. The divider can form a boundary at one interface, or can be constructed as an assembly to provide a plurality of concentric layers. The position of each divider must take into account the fill density of the soot, in order to accurately provide the amount of soot required to form the profile with layers of precise radial dimension. Once each compartment is filled with the desired soot, the divider is removed and a single radial press step is completed. To avoid undue mixing of adjacent soot layers, the removal of the divider should be kept strictly aligned with the axial direction of the press. A weak vibration, ranging from low frequency tapping to low power ultrasound, applied to the divider during its removal from the mold after loading the soots can enhance the ease of removal without mixing the adjacent soot at each diver interface.

These processes can also be leveraged in the case of a soot blank that is made with any number of combinations of OVD and pressed layers. For example one could press a blank and then prior to consolidation apply an additional OVD layer on the outside of the optical fiber preform. The OVD layer could for example have a reduced surface area compared to the pressed soot region, thereby suppressing the uptake of gaseous dopants during consolidation in this outermost annular layer of (OVD) soot. Another example would include the hybridization of a traditional OVD process by using a stretching or redraw step. One could prepare a pressed blank with a combination of OVD and pressed layers in any number of combinations, the blank could be consolidated and stretched or redrawn into a core cane or smaller uncompleted optical fiber preform which could then be processed through additional soot deposition—silica particle press—consolidation process steps again to impart additional desired RIPFs. The embodiments disclosed herein can include a nearly limitless combination of OVD and pressed particulate silica soots with redraw steps and subsequent overcladding steps.

Some OVD processes require soot deposition, consolidation, and stretching or redraw steps in order to produce a single refractive index feature, particularly in the cladding of the optical fiber. The invention disclosed herein enables the formation of multiple unique complex RIPFs using a single consolidation/sintering step. In some embodiments, more than 3, more than 5, and even more than 10 unique complex RIPF regions can be achieved using a single soot consolidation/sintering step.

The above described blankmaking approach has advantages over existing OVD processes because complex RIPFs with multiple, distinct regions of refractive index can be manufactured using a single soot consolidation step. Specifically, each layer of pressed soot replaces three process steps (laydown-consolidation-redraw) used in conventional OVD manufacturing of concentric complex RIPF fiber designs. This new approach could be used to eliminate the need for a stretching step altogether. This process thus has cost advantages over the traditional OVD process.

The invention has been tested and confirmed by measuring the radial chlorine concentration in a number of single layer pressed blanks made with OVD substrates.

Figure 3:
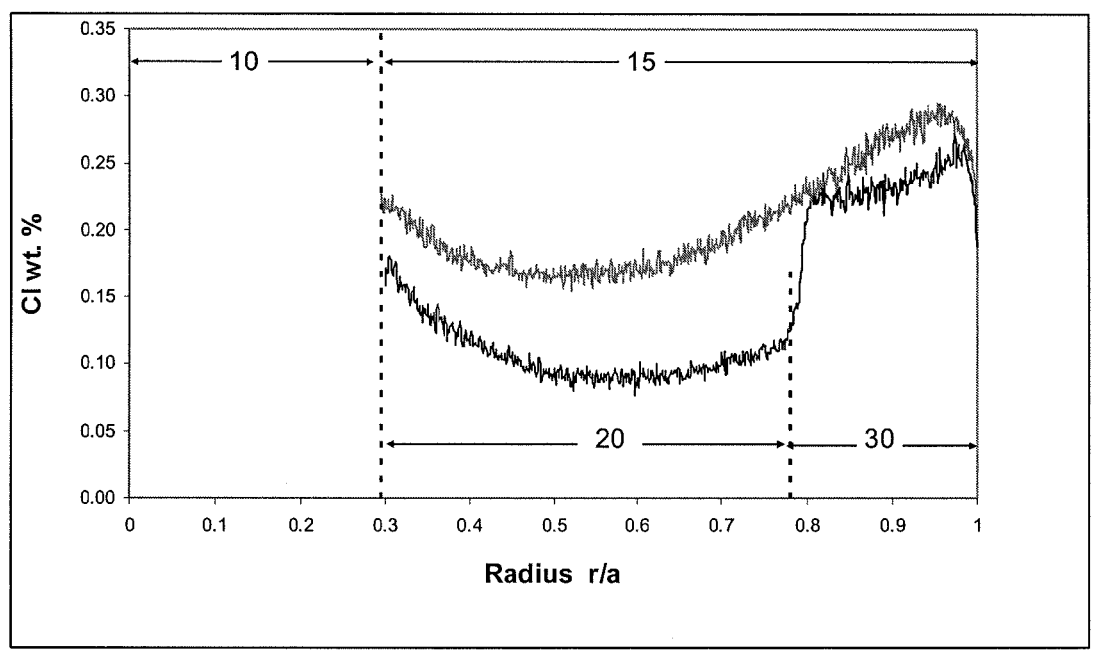
FIG. 3 is a graphical representations of electron microprobe analysis data illustrating overclad, doped chlorine concentrations as a function of normalized radius (r/a) for an OVD manufactured blank and a blank made via a radially pressed layer.

FIG. 3 shows a comparison of doped chlorine concentrations vs. radius for a preform made using OVD deposited cladding (upper cladding curve), and a preform having a pressed soot outer cladding region (lower cladding curve).

Both curves in FIG. 3 employ a consolidated core region 10 and a cladding region 15. The lower curve which employed a cladding region 15 which consisted of silica soot was deposited via outside vapor deposition to form inner cladding region 20, and silica soot which was pressed to form cladding region 30. As can be seen in FIG. 3, the pressed region has retained a significantly increased amount of chlorine dopant, even though the entire cladding region 15 was doped in a single doping step, followed by consolidation of the cladding region 15. The increased level of chlorine is due in large part to the increased surface area of the pressed soot region 30 compared to that of the OVD deposited soot region 20, and will result in a corresponding rapid change in refractive index in the pressed layer region of the consolidated blank as well as the optical fiber. We have found that particulate silica surface areas greater than 15 $m^2/g$, more preferably greater than 17 $m^2/g$, even more t preferably greater than 20 $m^2/g$, and even greater than 50 $m^2/g$ can be used to achieve controlled doping using the pressed particulate silica soot (powder) methods described herein. In fact, particulate silica surface areas as high as 250 $m^2/g$ or more can be utilized.

For a given chlorine gas concentration and sintering temperature, the amount of chlorine retained in any region of these two blanks is determined by soot density and soot surface area. The concentration in the OVD region of any blank has an inverse relationship with the density of the OVD soot blank; the lower the OVD soot density, the higher the concentration of chlorine retained in the resultant consolidated optical fiber. This density-concentration relationship is responsible for the trend in doped chlorine concentration in the standard OVD blank and the difference in doped chlorine concentrations for the OVD region of the pressed soot blank.

Figure 4:
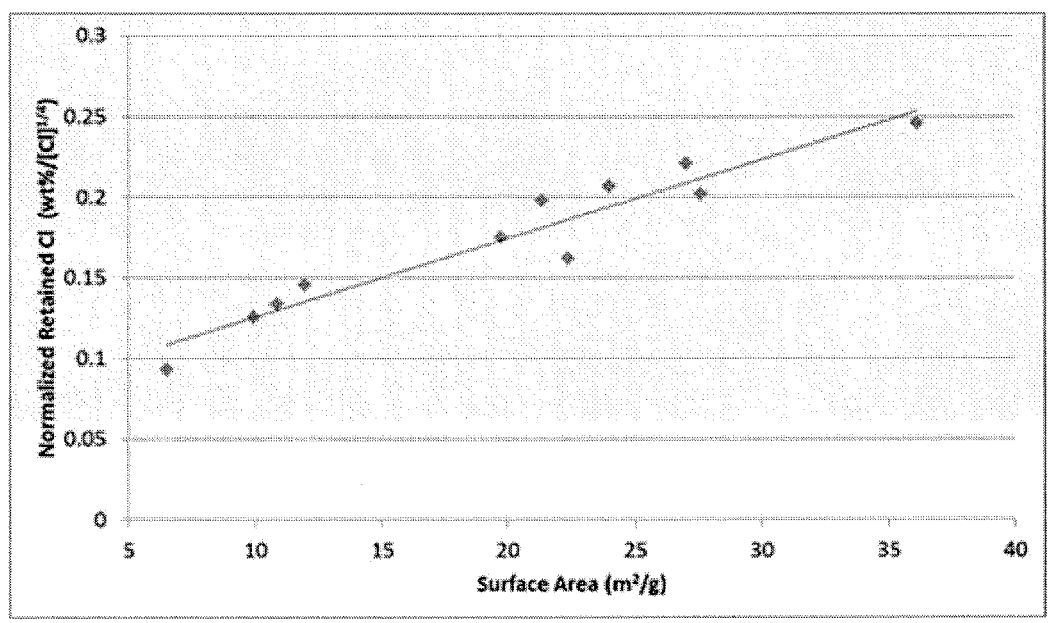
FIG. 4 is a graphical illustration of the correlation between soot particle surface area in a preform and retained chlorine in a finished glass article.

Conversely, the amount of chlorine retained in the fully sintered glass article made from a pressed layer region of a pressed soot blank is proportional to the soot surface area, as shown in FIG. 4. As shown in FIG. 3, the greater surface area of the pressed soot region results in more than twice the doped chlorine concentration even though the density of this region is approximately 50% higher than the OVD region.

In glass articles made by a CVD process, density and surface area are correlated and cannot necessarily or easily be decoupled. Specifically, an OVD body is comprised of concentric layers of soot that are deposited in a lathe at intermediate temperatures leading to partial consolidation or necking of neighboring soot particles. When the deposition flame temperature is increased (e.g. to increase density), necking or consolidation between particles increases thereby reducing surface area. Conversely, the soot pressing process decouples density and surface area. Since pressed layers are formed at room temperature with loose soot comprised of discrete silica particles, and the pressing process causes no change in surface area, pressed layers can be formed with a range of surface areas simply by introducing loose soot of varying surface areas into the press. The difference in free surface area between the OVD region and the pressed region of the blank is a primary driver for differences in chlorine retention during the consolidation process.

It will become apparent to those skilled in the art that various modifications to the disclosed embodiments can be made without departing from the spirit and scope of the appended claims.

What is claimed is:

1. A process for use in the manufacture of an optical fiber, comprising:
   preparing an inner cladding layer of silica soot which surrounds a core using an outside vapor deposition technique;

pressing at least one layer of silica powder over the inner cladding layer to obtain a monolithic soot blank, wherein the at least one layer of silica powder has a surface area that is different from the inner cladding layer; and sintering the monolithic soot blank in the presence of gaseous chlorine dopant, whereby the pressed layer retains a different concentration of chlorine than the inner cladding layer due to said difference in surface area of the at least one layer of silica powder.

2. A process according to claim 1, in which the gaseous chlorine dopant is selected from one of silicon tetrachloride, diatomic chlorine, phosphoryl chloride, and phosphorus trichloride.

3. A process according to claim 1, in which a layer of material is applied by outside vapor deposition over the pressed layer prior to sintering.

4. A process according to claim 1, wherein the surface area of the at least one layer of silica powder is greater than the surface area of the inner cladding layer.

5. A process according to claim 1, wherein said preparing an inner cladding step comprises depositing undoped soot onto the core and said pressing step comprises pressing said silica powder onto said deposited soot.

6. A process according to claim 1, wherein the pressed layer and inner cladding layer differs in at least one of density and porosity.

7. A process for manufacturing an optical fiber having complex refractive index profile features in which there is a step change in the refractive index over a distance less than 2 micrometers, comprising:

preparing a substrate using an outside vapor deposition technique;

pressing multiple concentric layers of silica powder over the substrate to obtain a monolithic soot blank having distinctively different concentric layers, each concentric layer being formed of silica powder having a different surface area; and sintering the monolithic soot blank in the presence of a gaseous chlorine dopant whereby each of the concentric layers retains a different concentration of chlorine dopant due to different surface areas of the concentric layers.

8. A process according to claim 7, wherein said multiple concentric layers have different density or porosity.

9. A process according to claim 7, wherein each of the concentric layers is pressed using a silica-based soot having a different chemical composition.

10. A process according to claim 7, wherein said pressing step comprises sequentially pressing different layers of soot, at least two of said layers differing in physical or compositional properties from one another.

11. A process according to claim 7, wherein said pressing step comprises positioning at least one removable divider within a mold, filling a space between or adjacent to said at least one divider, removing said at least one divider, and pressing said soot.

12. A process according to claim 10, in which each of the layers is pressed using a silica-based soot having a different solid dopant or a different solid dopant composition.

13. A process according to claim 11, in which each of the layers is pressed using a silica-based soot having a different solid dopant or a different solid dopant composition.

14. A process according to claim 13, in which the solid dopants are selected from solid dopants containing fluorine, boron, germanium, erbium, titanium, aluminum, lithium, potassium, bromine, cesium, chlorine, sodium, neodymium, bismuth, antimony, ytterbium, and combinations of these dopants.

15. A process according to claim 7, further comprising applying a layer of material by an outside vapor deposition technique on at least one of the pressed layers prior to sintering.

16. A process according to claim 7, further comprising, subsequent to said sintering step, redrawing the soot blank into a cane and subsequently pressing an additional layer and thereafter sintering said subsequently pressed additional layer of soot.

17. A process according to claim 7, wherein a pressure applied during pressing is varied for concentric pressed layers to vary the density of these layers and hence the gaseous sorption capacity to control dopant concentration in the respective pressed layers.

18. A process for manufacturing an optical fiber having complex refractive index profile features in which there is a step change in the refractive index over a distance less than 2 micrometers, comprising:

preparing a core containing substrate using an outside vapor deposition technique;

applying a plurality of layers of materials, each layer having a different chemical composition and a different surface area, by pressing silica powder onto said substrate, thereby forming a multilayer soot containing blank; and sintering the multilayer soot containing blank in a single consolidation step in the presence of a gaseous chlorine dopant such that each layer retains a different concentration of chlorine due to the difference in surface area.

19. The process of claim 18, further comprising, prior to said sintering step, depositing additional soot onto said multilayer soot containing blank via an outside vapor deposition technique.

20. The process of claim 18, wherein said plurality of layers comprises layers having different levels of the same dopant.

21. The process of claim 18, wherein the gaseous chlorine dopant is selected from one of silicon tetrachloride, diatomic chlorine, phosphoryl chloride, and phosphorus trichloride.

* * * * *